(12) United States Patent
Johnson et al.

(10) Patent No.: US 8,146,424 B2
(45) Date of Patent: Apr. 3, 2012

(54) SYSTEMS AND METHODS FOR AN INERTIAL SENSOR SUSPENSION THAT MINIMIZES PROOF MASS ROTATION

(75) Inventors: Burgess R. Johnson, Bloomington, MN (US); Jonathan M. Engel, Minneapolis, MN (US)

(73) Assignee: Honeywell International Inc., Morristown, NJ (US)

( * ) Notice: Subject to any disclaimer, the term of this patent is extended or adjusted under 35 U.S.C. 154(b) by 640 days.

(21) Appl. No.: 12/336,204

(22) Filed: Dec. 16, 2008

(65) Prior Publication Data
US 2010/0147073 A1 Jun. 17, 2010

(51) Int. Cl.
*G01C 19/56* (2006.01)
(52) U.S. Cl. ................... 73/504.12; 73/504.16
(58) Field of Classification Search ............... 73/504.12, 73/504.14, 504.16
See application file for complete search history.

(56) References Cited

U.S. PATENT DOCUMENTS

| | | | |
|---|---|---|---|
| 5,895,850 A | 4/1999 | Buestgens | |
| 5,920,012 A * | 7/1999 | Pinson | 73/504.12 |
| 6,250,156 B1 | 6/2001 | Seshia et al. | |
| 6,725,719 B2 | 4/2004 | Cardarelli | |
| 6,806,545 B2 | 10/2004 | Shim | |
| 6,860,151 B2 | 3/2005 | Platt et al. | |
| 6,882,083 B2 * | 4/2005 | Jerman et al. | 73/504.12 |
| 6,978,673 B2 * | 12/2005 | Johnson et al. | 73/504.12 |
| 7,148,549 B2 | 12/2006 | Ives et al. | |
| 7,267,005 B1 | 9/2007 | Kranz et al. | |

* cited by examiner

*Primary Examiner* — John Chapman, Jr.
(74) *Attorney, Agent, or Firm* — Fogg & Powers LLC (57) ABSTRACT

The present invention generally relates to systems and methods for an inertial sensor suspension that minimizes proof mass rotation and translation. The system contains a microelectromechanical sensor (MEMS) device for measuring rotation along an input rotation axis. The MEMS device includes at least one substrate, at least one proof mass, and a suspension system. The suspension system includes at least one flexure connecting the at least one proof mass to a substrate and at least one anchored suspension element with a split support beam having a first split portion and a second split portion. The first split portion and the second split portion are of curved shape.

18 Claims, 10 Drawing Sheets

SYSTEMS AND METHODS FOR AN INERTIAL SENSOR SUSPENSION THAT MINIMIZES PROOF MASS ROTATION

BACKGROUND OF THE INVENTION

Microelectromechanical sensor (MEMS) devices, such as mechanical resonators and inertial sensors, utilize mechanical suspensions to tailor their response to drive inputs and inertial forces along specific axes. These suspensions are designed to provide optimal sensitivity to desired input while at the same time minimizing sensitivity to undesired input. An area of particular importance is minimizing rotational motion of a sensor's proof masses in response to substantially linear input forces. Rotational motion of a proof mass contributes to inaccurate sensor output, reduced sensitivity to linear input forces, and an overall decrease in a number of other meaningful performance characteristics.

An example MEMS device with suspension elements, whose resistance to rotational motion is particularly critical, is an out-of-plane tuning fork gyroscope (OPG). An OPG typically includes at least two proof masses with an upper substrate disposed above each proof mass and/or a lower substrate disposed below each proof mass.

Further, an OPG typically has lateral drive motors (e.g., comb drive motors) on either side of the proof masses, driving the proof masses to continuously vibrate along a lateral drive axis at a motor resonant frequency, similar to the halteres of insects. With a rotational input about an axis perpendicular to the plane of the substrates, the proof masses experience Coriolis forces perpendicular to the drive axis and perpendicular to the input rotation axis. The Coriolis forces produce equal and opposite motion (differential displacement) of the two proof masses parallel to the plane of the substrates and perpendicular to the drive axis. This differential displacement of the proof masses is measured by transducers, which typically consist of interdigitated comb finger pairs, one member of each pair being attached to the substrates, the other member being attached to a proof mass, in order to form a sense capacitance. In the presence of a DC sense bias voltage on the sense capacitance, differential displacement of the proof masses results in a change in the charge on the sense capacitance proportional to the input rotation rate. Typically, the change in charge is converted to an output voltage by an electronic amplifier. The ratio of the output voltage to the input rotation rate defines the scale factor of the device.

Figure 1:
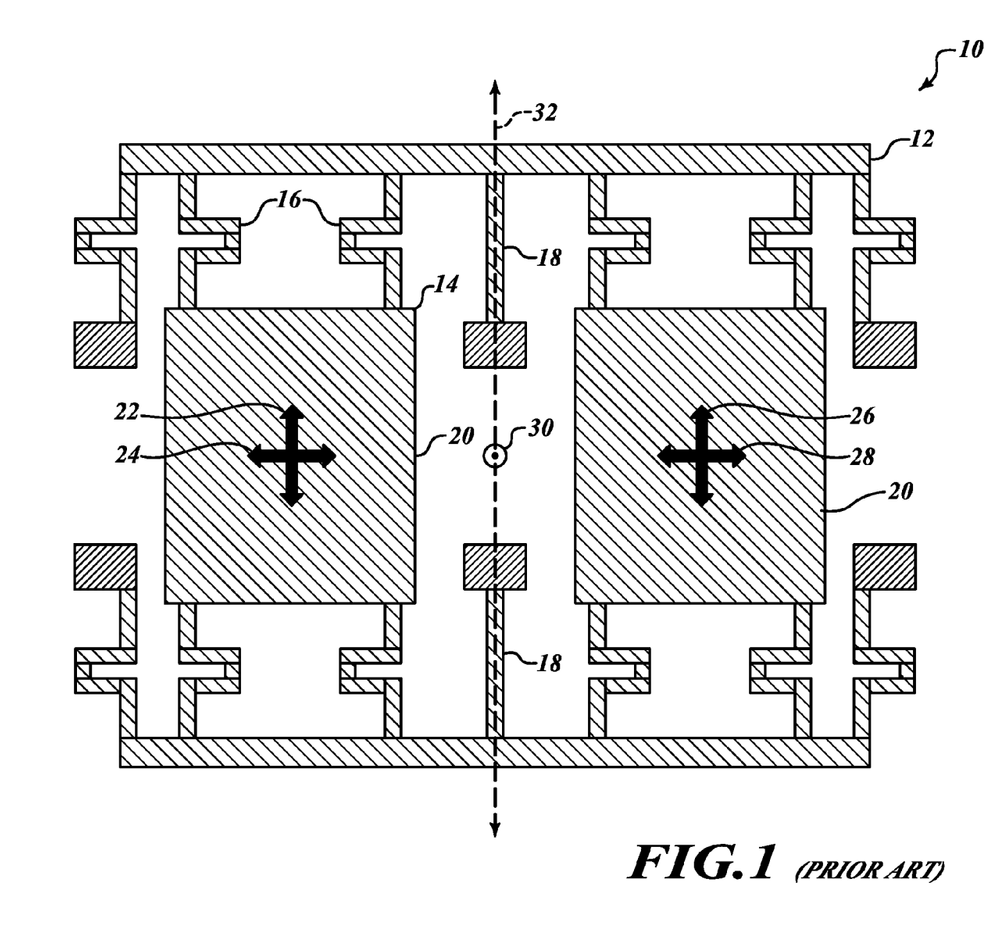
FIG. 1 illustrates a schematic view of a tuning fork gyroscope in accordance with the prior art.

FIG. 1 illustrates a prior art OPG 10 having multiple suspended proof masses 20 coupled to a crossbar portion 12 with multiple flexure suspension elements 16 of uniform stiffness. Drive motion of the OPG 10 is coupled between the proof masses 20 with anchored suspension elements 18 that lie along a sense axis 32 in plane with and between the proof masses 20. The arrows 22 and 26 running parallel with the sense axis 32 represent a direction of an on-axis response, whereas the arrows 24 and 28 running perpendicular to the sense axis 32 represents a direction of an off-axis response. In this configuration, a sense axis motion, represented by arrows 22 and 26, runs parallel with the sense axis 32, whereas a drive axis motion, represented by arrows 24 and 28, runs perpendicular with the sense axis 32; both motions are in plane with the OPG 10. An undesirable rotational motion of the proof masses occurs about an axis 30 perpendicular to the plane of the OPG 10.

Figure 21:
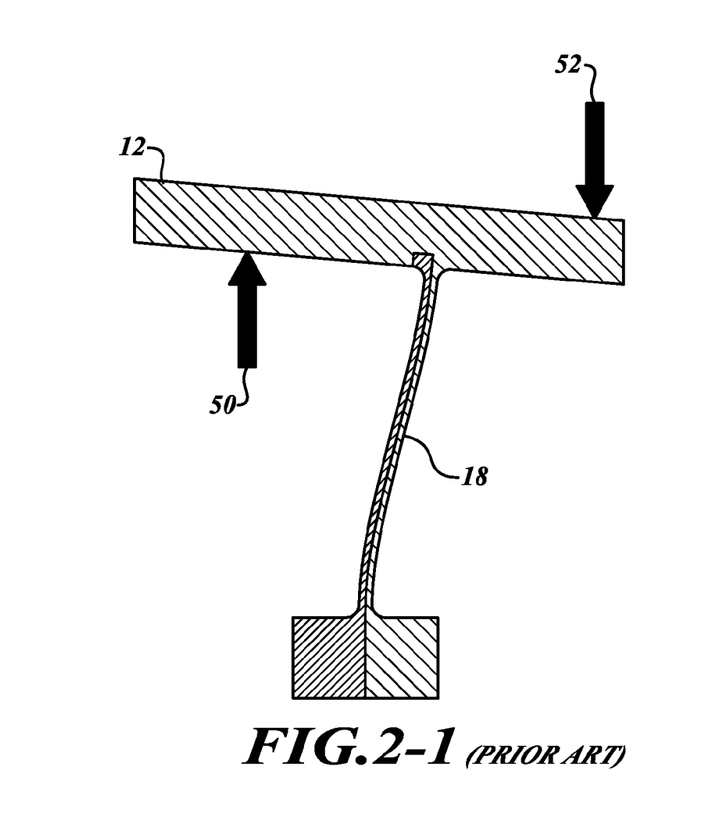
Figure 22:
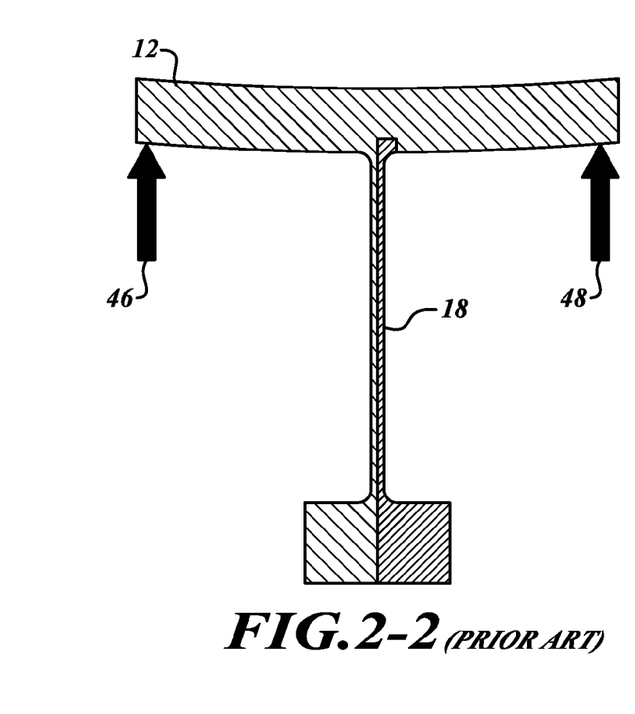

FIG. 2-1 illustrates a diagram showing the suspension element 18 experiencing a differential force (arrows 50 and 52). FIG. 2-2 illustrates a diagram showing the anchored suspension element 18 experiencing a common mode force (arrows 46 and 48). The differential force produces a significant bend in the suspension element 18 (a low-stiffness response) having stressed right and left side portions. The opposing differential input forces can cause an undesired rotation of the proof masses 20 about the axis 30. The common mode force does not cause the suspension element 18 to bow (a high-stiffness response) in response to a uniform common mode input force.

Figure 3:
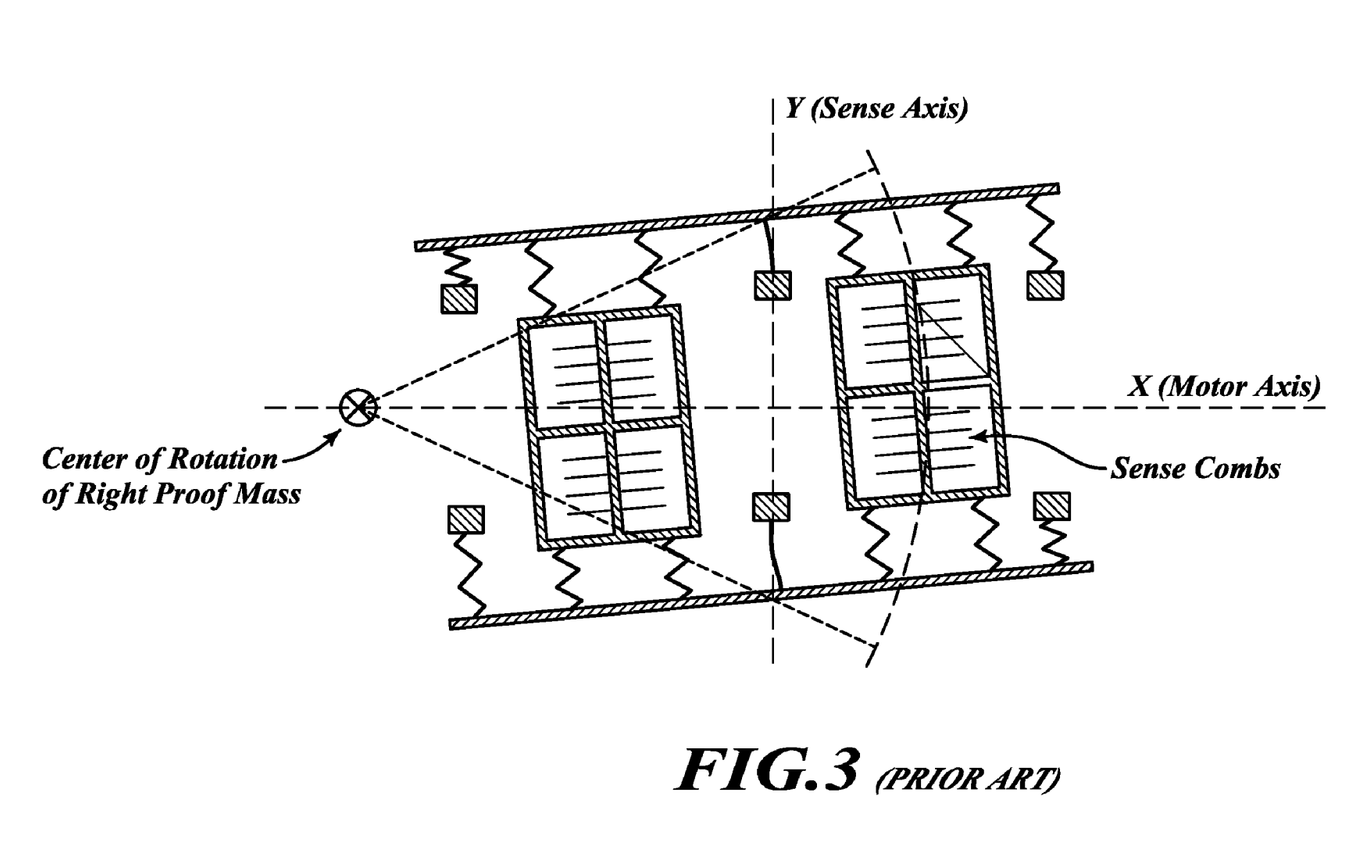
FIG. 3 illustrates a schematic view of the response of an anchored suspension element in accordance with the prior art.

Further, the motion of the combined flexure suspension elements 16 and the anchored suspension elements 18 along the drive axis 28 can interfere with a desired differential motion of the proof masses 20 along the sense axis 26. This interference causes a differential sense motion to have an adverse rotational character (see FIG. 3), as opposed to a desired purely translational character. Other important performance characteristics are also negatively impacted, including a reduced electrostatic spring softening of a sense mode, a reduced electrostatic actuator strength of associated force rebalance torquer electrodes, and a reduced sensitivity of a sensor to desired rotational input (measured as a scale factor).

SUMMARY OF THE INVENTION

The present invention provides for systems and methods for an inertial sensor suspension that minimizes off-axis motion. The present invention includes a microelectromechanical system (MEMS) sensor for measuring rotation about an input rotation axis, i.e. a MEMS gyroscope. This MEMS device includes a substrate, at least one proof mass, and a suspension system. The suspension system includes at least one flexure connecting the at least one proof mass to the substrate (via crossbars) and at least one anchored suspension element with a split support beam having a first split portion and a second split portion. The first split portion and the second split portion are of a curved shape.

In accordance with a further aspect of the invention, the anchored suspension element is of substantially wishbone shape and is configured to resist rotational movement of the at least one proof mass around an input rotation axis in response to a differential or common mode input force.

In accordance with another aspect of the invention, the at least one flexure is of substantially hairpin shape and is configured to resist rotational movement of the at least one proof mass around an input rotation axis in response to a differential or common mode input force.

BRIEF DESCRIPTION OF THE DRAWINGS

Preferred and alternative embodiments of the present invention are described in detail below with reference to the following drawings:

FIGS. 2-1 and 2-2 illustrate an exploded view of an anchored suspension element of a tuning fork gyroscope in accordance with the prior art;

FIGS. 4-1 and 4-2 illustrate an exploded view of an anchored suspension element of a MEMS device in accordance with an embodiment of the present invention;

FIG. 5 illustrates a schematic view of the response of an anchored suspension element in accordance with an embodiment of the present invention;

FIGS. 6-1 and 6-2 illustrate an exploded view of a pair of flexure suspension elements of a MEMS device in accordance with an embodiment of the present invention.

DETAILED DESCRIPTION OF THE INVENTION

The present invention provides for an improved microelectromechanical sensor (MEMS) suspension design that utilizes multiple suspension elements to minimize an adverse off-axis motion of proof masses within a MEMS device. In an exemplary embodiment, this is accomplished by incorporating multiple flexure suspension elements, which are optimized (e.g., by varying stiffness) to receive a differential sense axis motion, with anchored suspension structures that are flexible to differential mode inputs and stiff to common mode inputs. The incorporation of both suspension elements effectively minimizes undesired rotational motion of a proof mass within the MEMS device. In an embodiment the MEMS device relates to, but is not limited to, an out-of-plane tuning fork gyroscope (OPG).

Figure 41:
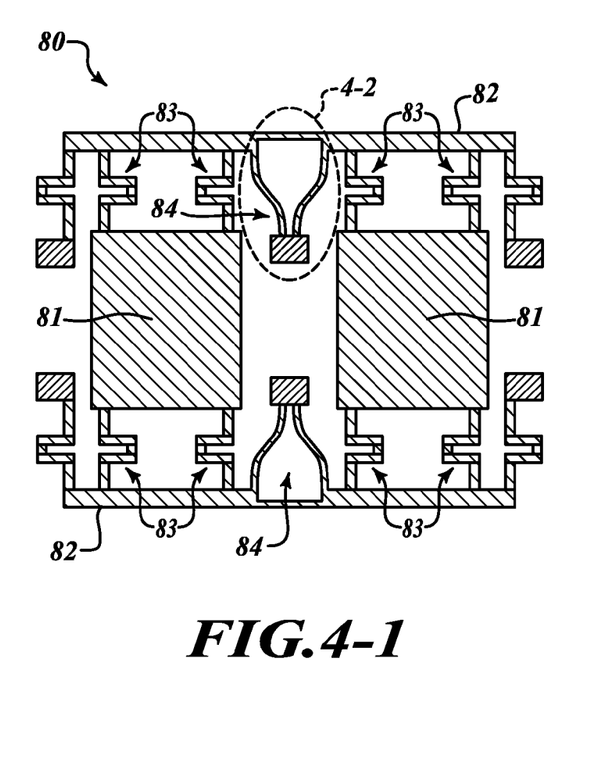

FIG. 4-1 illustrates an anchored suspension element 84 in a MEMS device 80 in accordance with an embodiment of the present invention. The MEMS device 80 includes two proof masses 81, which are each coupled to crossbars 82 with multiple flexure suspension elements 83. The MEMS device 80 also includes multiple anchored suspension elements 84 connecting the crossbars 82 and anchored to a lower MEMS substrate (not shown).

Figure 42:
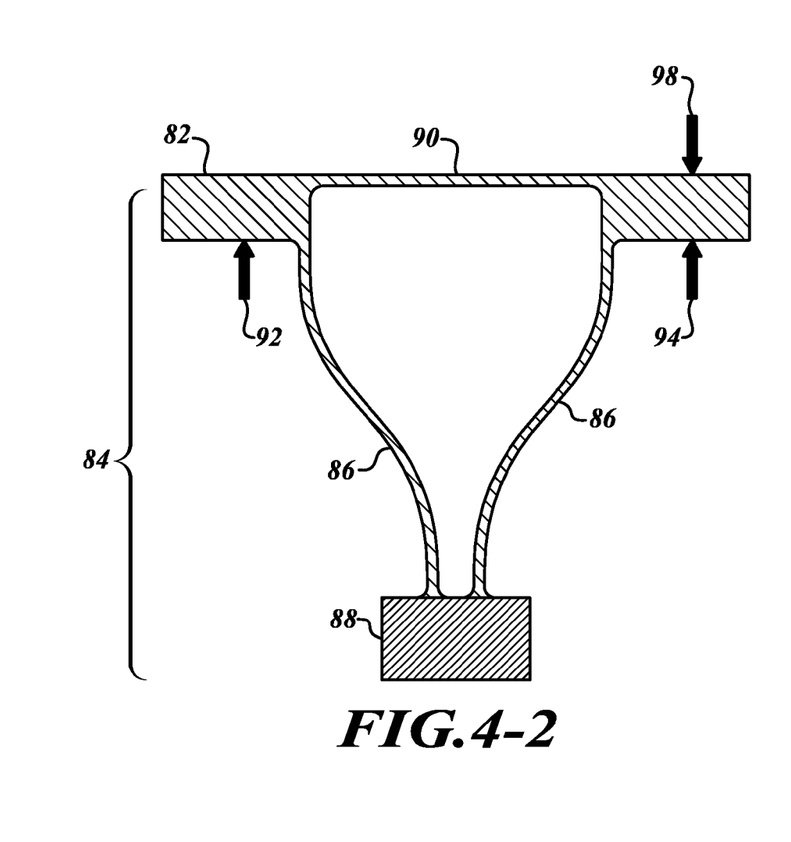

FIG. 4-2 illustrates the anchored suspension element 84, which includes an anchor 88, two support beams 86, and a thinned segment 90 of the respective crossbar 82. In an exemplary embodiment, the anchored suspension elements 84 are generally formed in a wishbone shape and the flexure suspension elements 83 are generally formed in a hairpin spring shape. Each of the support beams 86 attach at a first end to the anchor 88 separated by a first width. A second end of the support beams 86 attach to the same crossbar 82 separated by a second width. The first width is smaller than the second width. The thinned segment 90 is located between the connected second ends of the support beams 86.

The anchored suspension elements 84 and the flexure suspension elements 83 are designed to resist rotational movement of the proof masses 81 around an input rotation axis in response to differential force (arrows 92 and 98) or resist translational motion of the proof masses due to the common mode force (arrows 92 and 94). Other shapes for the support beams 86 can be used provided they produced the same benefit described above.

Figure 51:
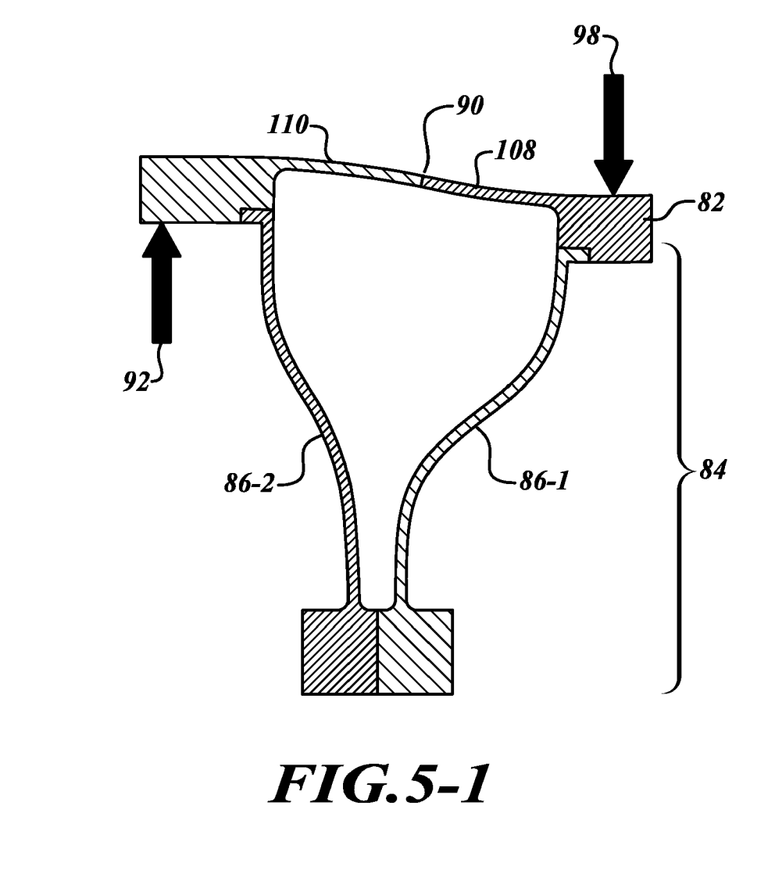

FIG. 5-1 illustrates how the anchored suspension elements 84 respond to a differential force (arrows 92 and 98). A left portion 110 of the thinned section 90 of the crossbar 82 and a right portion 86-1 of the split support beam 86 compensate for the applied differential force (arrows 92 and 98) with an absorbing response (compression), while simultaneously a right portion 108 of the thinned section 90 and a left portion 86-2 of the split support beam 86 responds to the differential force with an extension.

Figure 52:
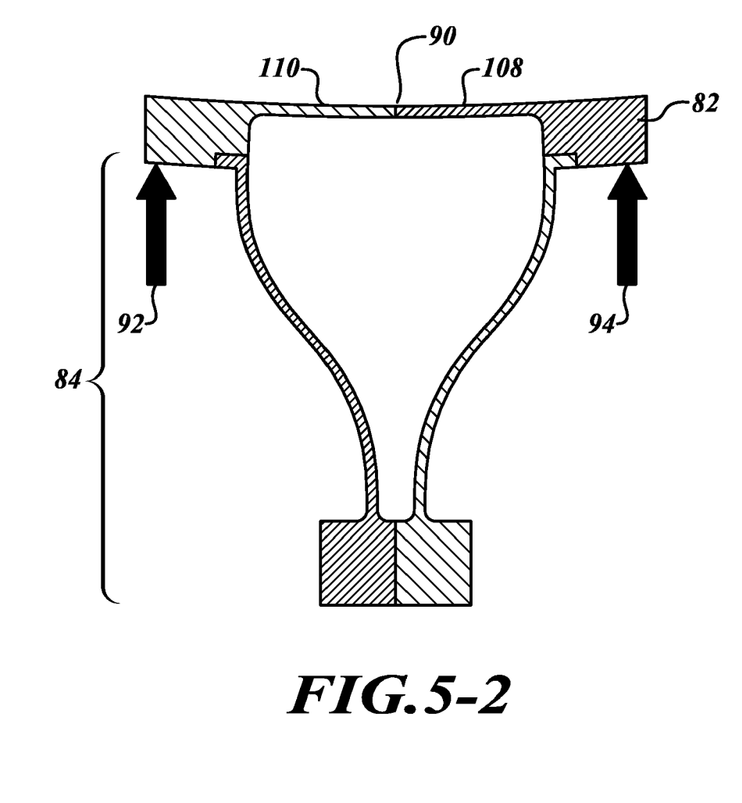

FIG. 5-2 illustrates how the anchored suspension elements 84 respond to a common mode force (arrows 92 and 94). The left portion 110, the right portion 108 and the left and right portions 86-1, 86-2 of a split support beam 86 compensate for the applied common mode force (arrows 92 and 94) with a uniform stabilizing response.

The synergistic response of the left and right portions 86-1, 86-2 of anchored suspension elements 86 provides for improved selective stiffness to differential and common mode inputs, thereby allowing purely translational motion of individual proof masses along the sense axis. Further, an undesirable off-axis rotation of the proof masses is minimized and resonant frequency spacing is maintained between modes consisting of differential and common mode motion of the proof masses.

Figure 61:
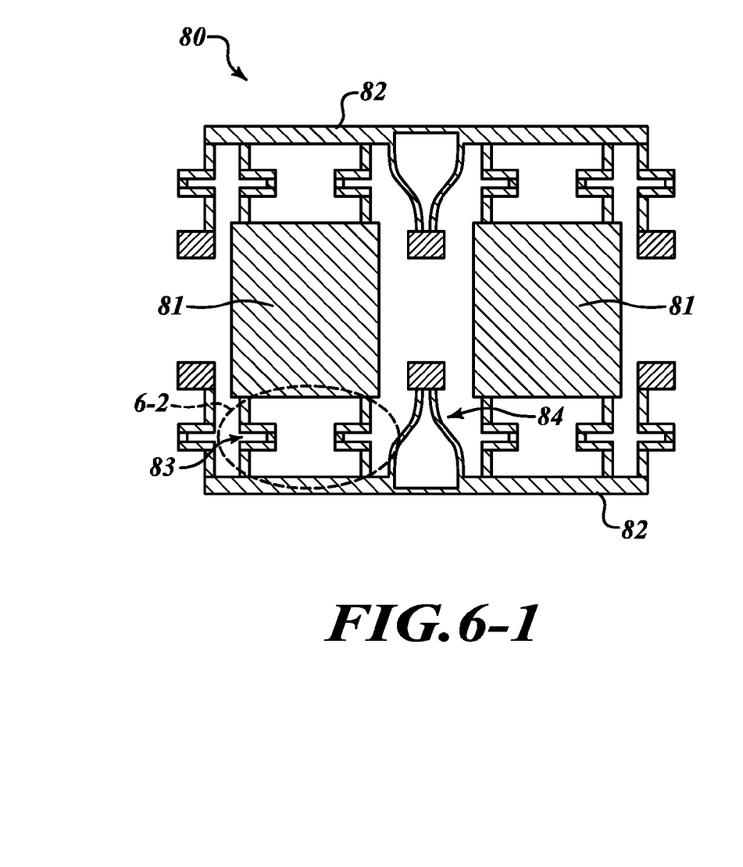
Figure 62:
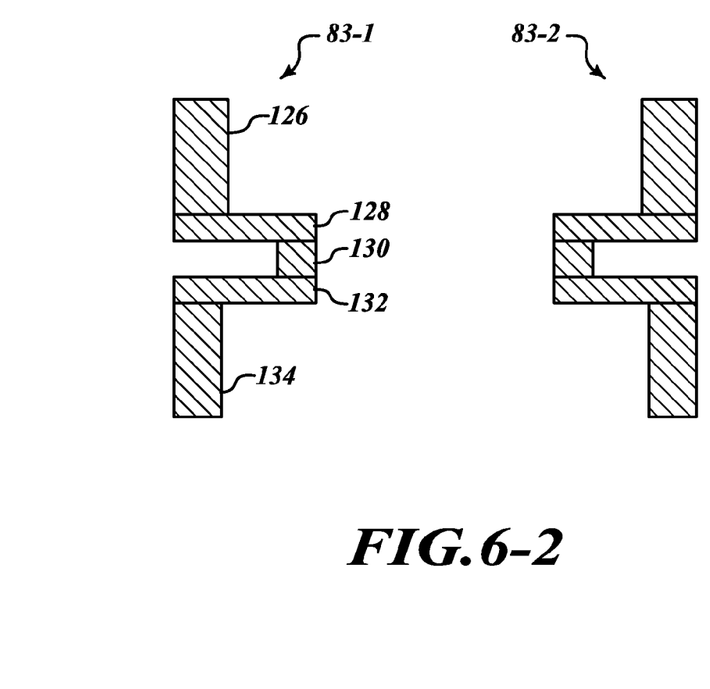

FIG. 6-1 illustrates flexure suspension elements 83 that couple the proof masses 81 to the respective crossbars 82. FIG. 6-2 illustrates an embodiment where the flexure suspension elements 83 located on one side of the proof mass 81 are two hairpin spring flexures 83-1, 83-2 of varying stiffness, each having a plurality of elongate connecting portions 126 and 134, and a plurality of spring portions with two crossbar portions 128 and 132 and one connecting portion 130. In an embodiment, one of the elongate connecting portions 134 connects to the crossbar 82, while the other elongate connecting portion 126 connects to the proof mass 81. The hairpin spring flexures 83-1, 83-2 have symmetry about their center, so that the portions 126 and 134 are identical, and the portions 128 and 132 are identical.

In one embodiment, the component portions (126, 128, 130, 132, and 134) of two adjacent hairpin spring flexures 83-1, 83-2 can be of different thickness, length, width, density, shape, or material, such that the hairpin spring flexures 83-1, 83-2 are individually optimized for receiving a differential sense axis motion and resisting rotation of the proof masses 81.

When combined with the anchored suspension elements 84, the optimized flexure suspension elements 83 further help to minimize rotation of a proof mass 81 in response to differential input forces. The severity of rotation in the differential sense response of a MEMS device can be characterized by the radius of rotation a proof mass describes while moving in response to a sensor input force. In purely translational motion, where there is no off-axis component, the proof mass 81 moves with an infinite radius. When finite rotation is present, the off-axis component increases with decreasing radius. In one embodiment, the combined suspension elements (84 and 83) of the present invention can increase the radius of differential sense motion by more than a factor of two, compared to existing prior art designs (e.g., FIGS. 1-3).

In one embodiment, the suspension elements (84 and 83) allow common mode inputs to be channeled in tension and compression, which stiffens the suspension response, while differential mode inputs are channeled in bending, softening the suspension response. Altering the combination of these two effects can be achieved by selectively thinning, thickening, shortening, or lengthening suspension element components. In another embodiment, this effect can also be achieved by changing the curvatures of the anchored suspension elements 84 or the placement or shape of the spring (128, 130, and 132) in the flexure suspension element 83.

Figure 7:
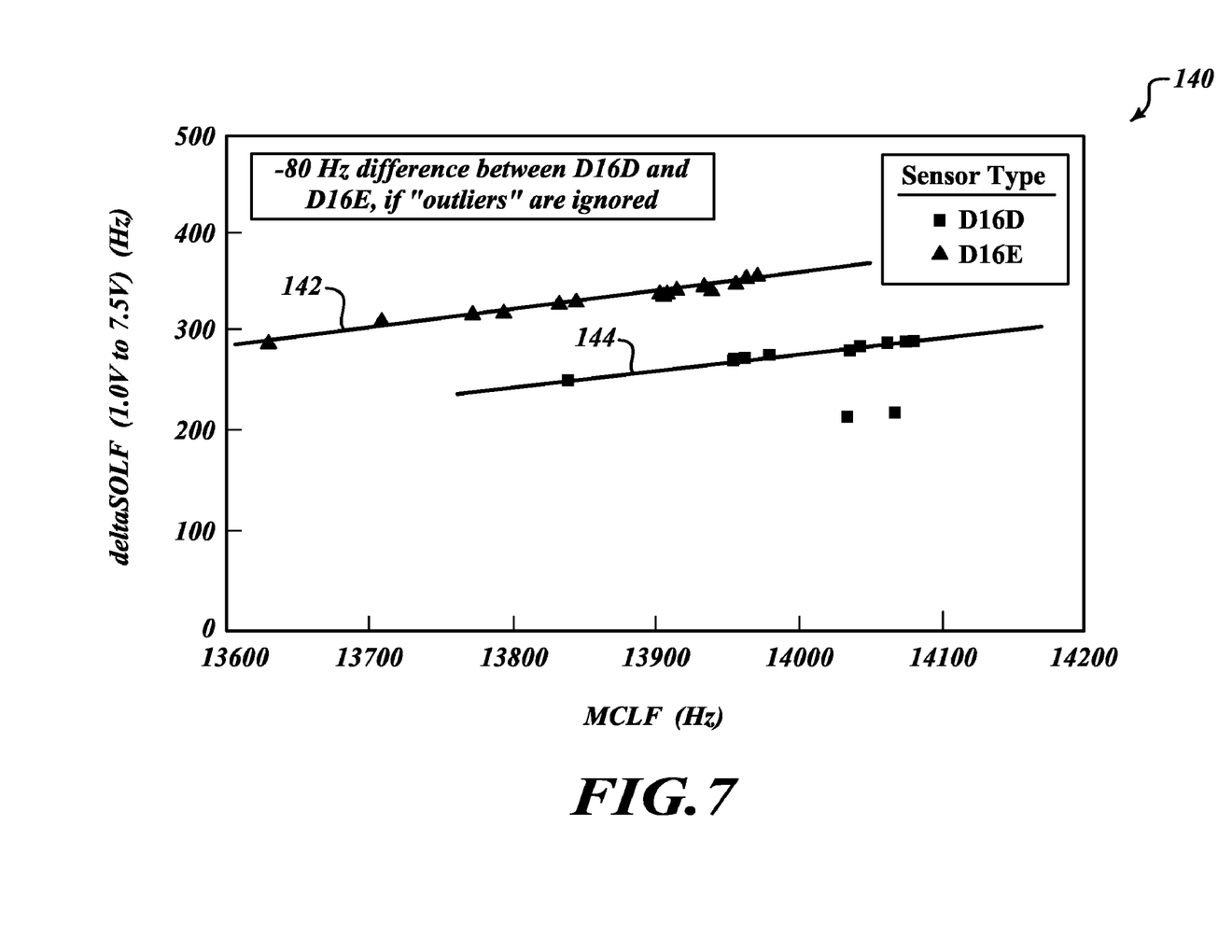
FIGS. 7-10 are plots of suspension design test data in accordance with various embodiments of the present invention.

Test data shows that the sensitivity of devices incorporating the suspension systems of the present invention increased significantly. Further, electrostatic softening of the spring constant for differential motion of the proof masses is also increased. The strength of MEMS force rebalance torquer actuators attached to the proof masses is also increased. FIG. 7 illustrates a plot 140 of MEMS device (e.g., OPGs) test data (142 and 144) showing the effect of electrostatic softening in MEMS devices for the suspension system of the present invention and the suspension systems of prior art (e.g., FIGS. 1-3). Each data point in the plot represents one sensor, showing the measured change in the sense resonant frequency (deltaSOLF, units of Hz) as sense bias voltage is varied from 1.0V to 7.5V, and the motor resonant frequency (MCLF, units of Hz), which does not change significantly as sense bias voltage is varied. The sense resonant frequency corresponds to the resonant mode consisting of differential motion of the two proof masses along the sense axis 32 shown in FIG. 1. The shift in sense resonant frequency with sense bias voltage is caused by electrostatic softening. The data 142 is from sensors of design type D16E, which have the suspension system of the present invention. The data 144 is from sensors of design type D16D, which has prior art suspension systems similar to that of FIGS. 1-3. The only difference between the D16D and D16E sensor designs is the design of the suspensions. The data in FIG. 7 show that the D16E sensors exhibit a sense frequency shift approximately 80 Hz larger than that of the D16D sensors, when sensors with similar motor resonant frequencies are compared. Thus, the suspension system of the present invention in the D16E sensors results in a significant increase in electrostatic softening, compared to the prior art suspension system in the D16D sensors.

Figure 8:
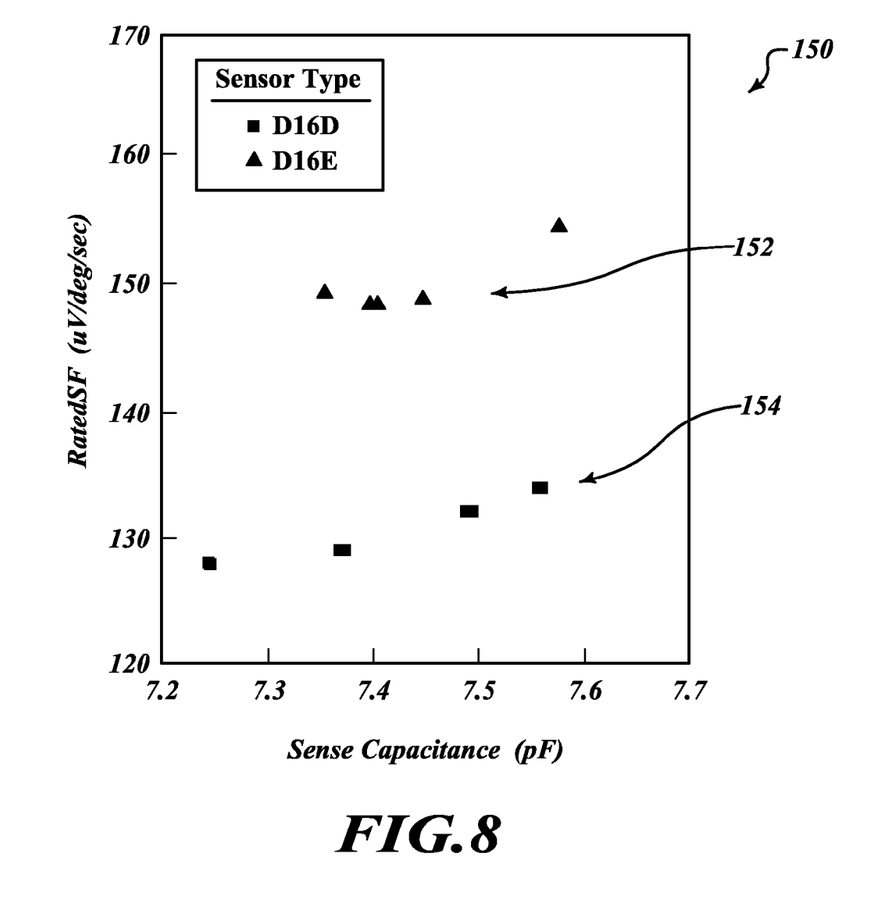

FIG. 8 illustrates a plot 150 of MEMS device (e.g., OPGs) test data (152 and 154) showing the measured scale factors (ratedSF) of MEMS devices having various values of sense capacitance. The suspension system of the present invention (D16E sensors) has measurement data 152 corresponding to a much higher rated scale factor compared with the measurement data 154 of the prior art (D16D sensors). The higher scale factor of the D16E sensors is not caused by higher sense capacitance, as FIG. 8 shows that the sense capacitances of the D16E and D16D sensors are comparable.

Figure 9:
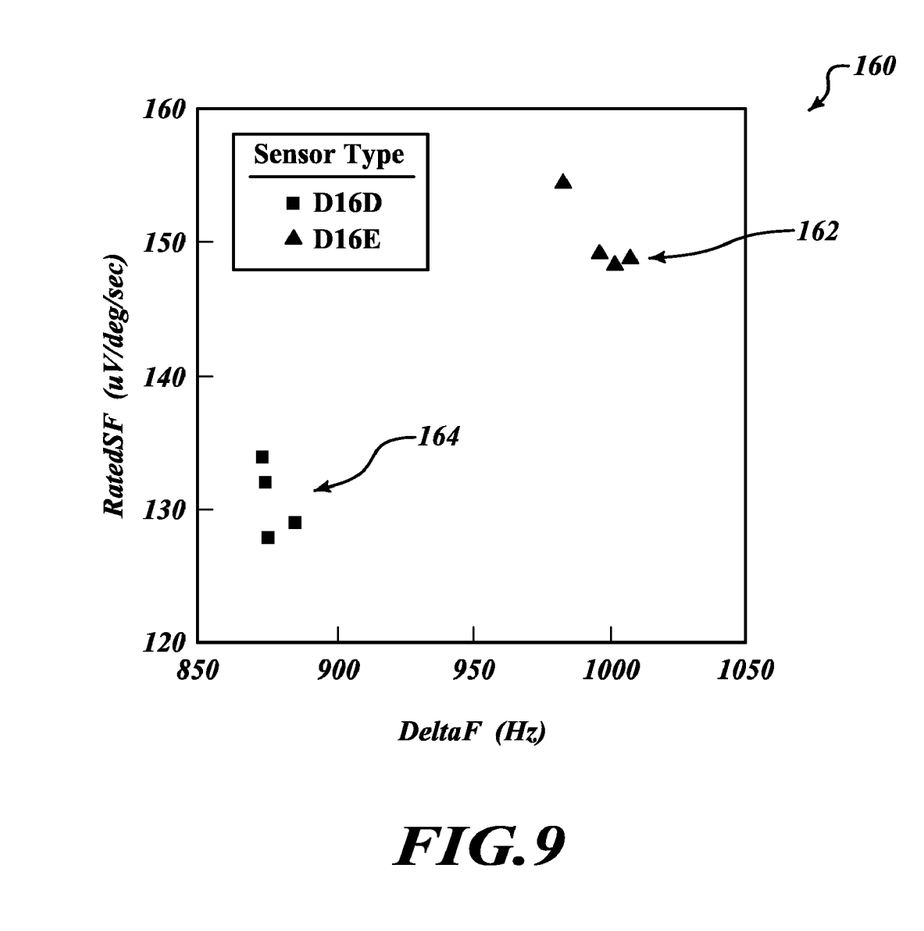

FIG. 9 illustrates a plot 160 of MEMS device (e.g., OPGs) test data (162 and 164) showing the measured scale factors (ratedSF) of MEMS devices having various values of the separation between sense and motor resonant frequencies (DeltaF). The scale factor of a MEMS gyroscope is inversely proportional to its DeltaF. The suspension system of the present invention (D16E sensors) has measurement data 162 corresponding to a much higher rated scale factor compared with the measurement data 164 of the prior art (D16D sensors). The D16E sensors also have larger DeltaF than that of the D16D sensors, which tends to reduce the scale factor of the D16E sensors relative to that of the D16D sensors. The suspension system of the present invention more than compensates for the effect of large DeltaF in the D16E sensors.

Figure 10:
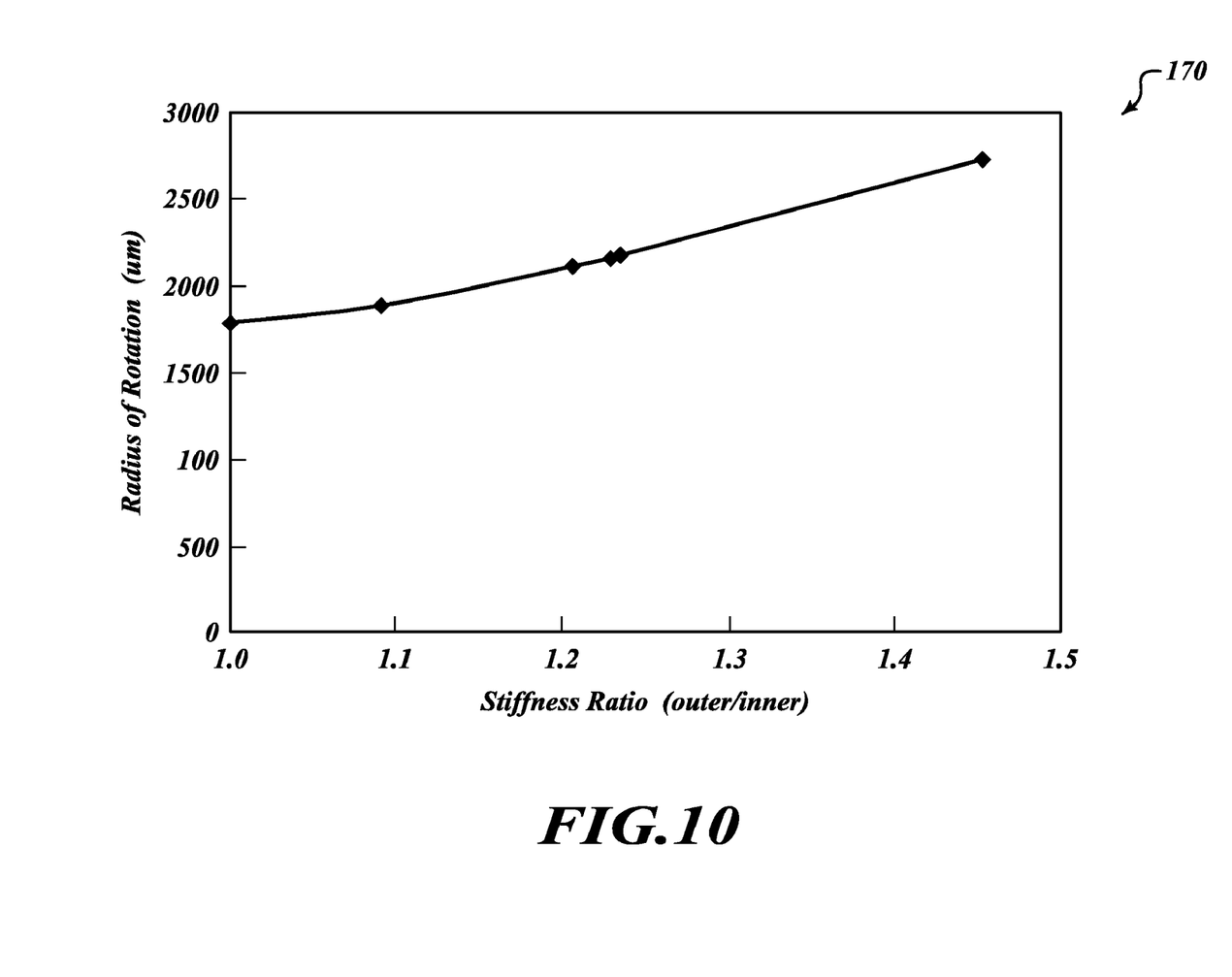

FIG. 10 illustrates a plot 170 showing the calculated radius of rotation of the proof masses of an OPG, obtained by finite element modeling simulations, as a function of the ration of the sense-axis stiffness of suspension 83-1 to that of suspension 83-2 shown in FIG. 6-2. As the stiffness ratio increases, the radius of rotation increases, and the motion of the proof masses approaches the desired case of purely linear translation along the sense axis.

While several embodiments of the present invention have been illustrated and described herein, many changes can be made without departing from the spirit and scope of the invention. Accordingly, the scope of the invention is not limited by any disclosed embodiment. Instead, the scope of the invention should be determined from the appended claims that follow.

The embodiments of the invention in which an exclusive property or privilege is claimed are defined as follows:

1. A microelectromechanical system (MEMS) device for measuring rotation about an input axis, the device comprising:
    a substrate;
    at least one proof mass; and
    a suspension system comprising:
        at least two crossbars;
        at least one flexure connecting the at least one proof mass to one of the crossbars; and
        at least two anchored suspension elements comprising a split support beam having a first split portion and a second split portion, wherein the at least two anchored suspension elements are connected between the at least two crossbars and substrate anchors,
        wherein first ends of the first split portion and the second split portion are separated by a first width and second ends of the first split portion and the second split portion are separated by a second width, the first width being smaller than the second width.

2. The device of claim 1, wherein the at least two anchored suspension elements are configured to resist rotational movement of the at least one proof mass around the input rotation axis in response to a differential force and resist translational movement due to a common mode input force.

3. The device of claim 1, wherein the anchored suspension element further comprises an anchor connecting the first split portion to the second split portion and wherein the first and second split portions are curved.

4. The device of claim 3, wherein the anchored suspension element is substantially a wishbone shape.

5. The device of claim 1, wherein the at least two crossbars comprise a thinned crossbar connecting the first split portion to the second split portion.

6. The device of claim 1, wherein the at least one flexure is configured to resist rotational movement of the at least one proof mass around the input rotation axis in response to a differential force.

7. The device of claim 6, wherein the at least one flexure is substantially a hairpin spring shape.

8. The device of claim 7, wherein at least two flexures are configured to be different in at least one of thickness, length, width, density, shape, or material in order to resist rotational movement of the at least one proof mass around the input rotational axis in response to a differential force.

9. A suspension element for a microelectromechanical sensor (MEMS) device that measures rotation about an input axis, the suspension element comprising:
    a split support beam having a first split portion and a second split portion, wherein the first split portion and the second split portion are configured to resist translation along a sense axis;
    a thinned crossbar connecting the first split portion to the second split portion, wherein the thinned crossbar is within a central portion of a crossbar, wherein the central portion is thinner than a first end and a second end of the crossbar; and
    an anchor connecting the first split portion and the second split portion, wherein the split support beam is further configured to resist a rotational movement about an input rotation axis,
    wherein ends of the first split portion and the second split portion connected to the anchor are separated by a first width and ends of the first split portion and the second split portion not connected to the anchor are separated by a second width, the first width being smaller than the second width.

10. The suspension element of claim 9, wherein the first split portion and the second split portion are curved.

11. The suspension element of claim 10, wherein the first split portion and the second split portion are substantially a wishbone shape.

12. The suspension element of claim 9, wherein the anchor of the suspension element is connected to a substrate portion of the MEMS device.

13. A microelectromechanical sensor (MEMS) device that measures rotation about an input axis, the device comprising:

a substrate;

two crossbars coupled to the substrate;

two proof masses supported in a manner to define an input rotation axis; and a plurality of suspension elements configured to connect the two proof masses to the two crossbars, wherein at least two adjacent suspension elements in the plurality of suspension elements are configured to be different from each other in at least one of thickness, length, width, density, shape, or material in order to resist rotational movement of at least one of the two proof masses around the input rotation axis in response to a differential force or resist translational movement due to a common mode input force.

14. The MEMS device of claim 13, wherein each of the plurality of suspension elements comprises:

a first elongate portion;

a second elongate portion;

a first crossbar portion;

a second crossbar portion; and a crossbar connection portion.

15. The MEMS device of claim 14, wherein the suspension element is substantially a hairpin spring shape.

16. The MEMS device of claim 14, wherein the first elongate portion of the suspension element is connected to one of the crossbars.

17. The MEMS device of claim 14, wherein the second elongate portion of the suspension element is connected to a proof mass of the MEMS device.

18. The MEMS device of claim 14, wherein the crossbar connection portion is thicker than the first elongate portion, the second elongate portion, the first crossbar portion, and the second crossbar portion.

* * * * *